W. FISHBAUGH.
VULCANIZER.
APPLICATION FILED JUNE 23, 1919.
1,346,085.
Patented July 6, 1920.
2 SHEETS—SHEET 2.
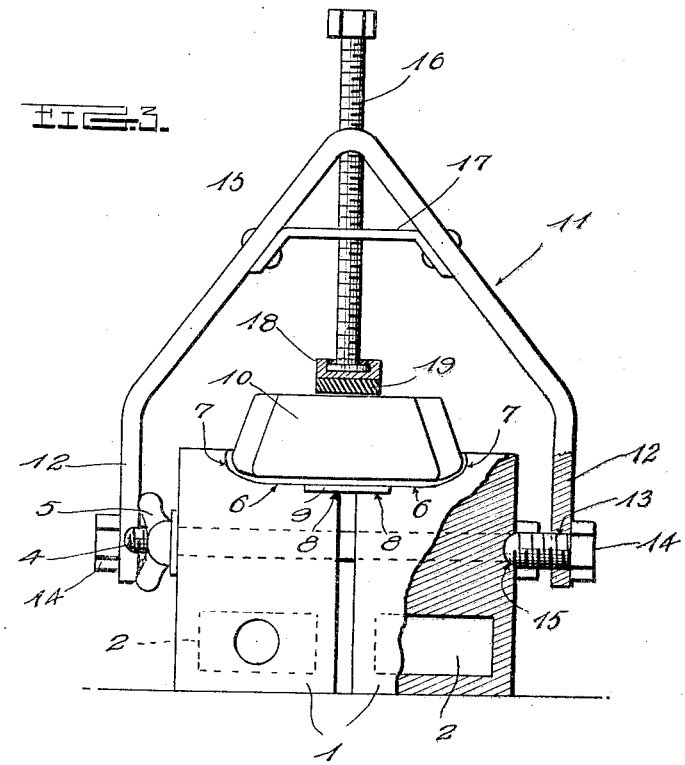
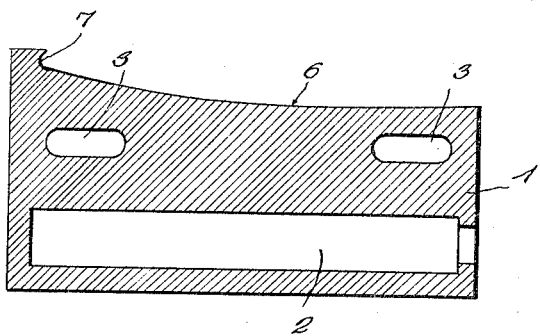
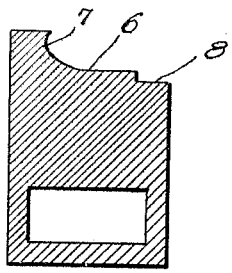
Witness
George W. Giovanetti
Inventor
W. Fishbaugh
By H. B. Willson & Co.
Attorneys

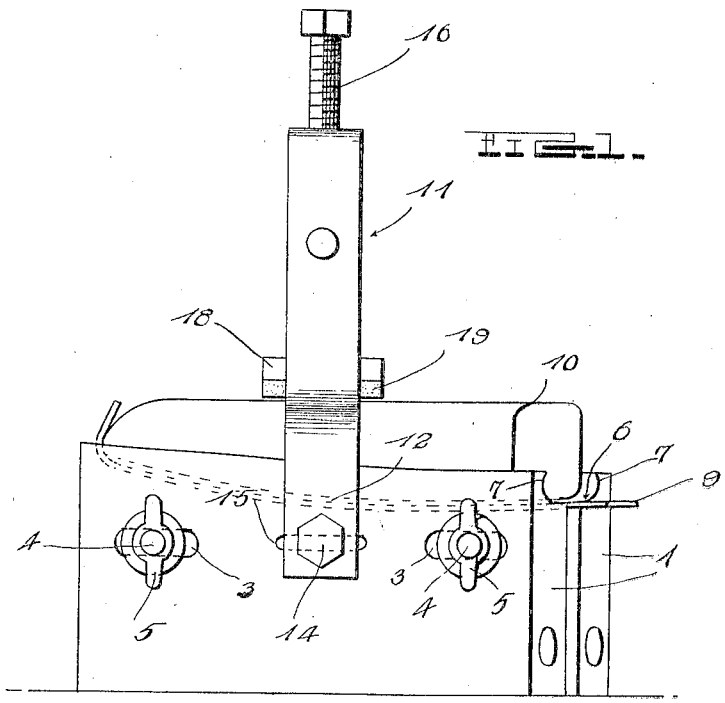
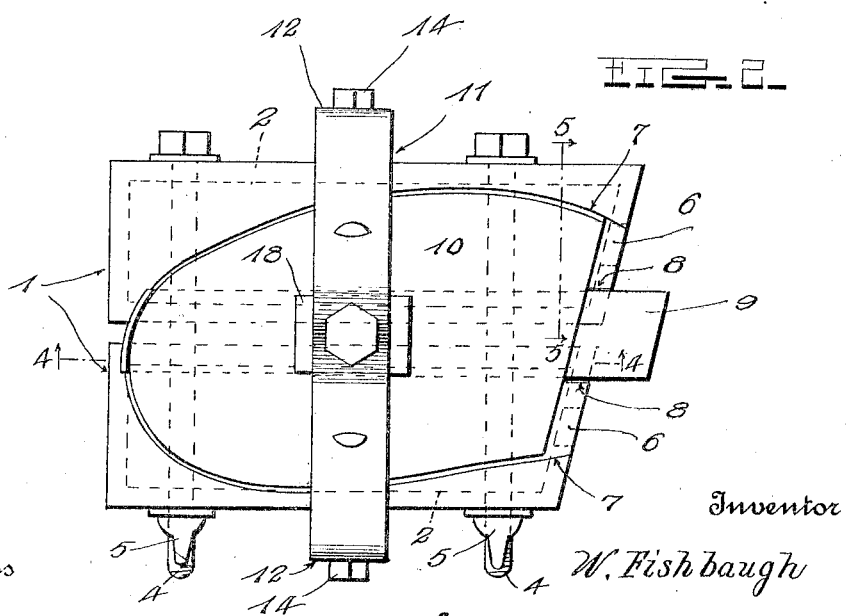

UNITED STATES PATENT OFFICE.

WILLIAM FISHBAUGH, OF NEWARK, OHIO.

VULCANIZER.

1,346,085. Specification of Letters Patent. Patented July 6, 1920.

Application filed June 23, 1919. Serial No. 306,175.

*To all whom it may concern:*

Be it known that I, WILLIAM FISHBAUGH, a citizen of the United States, residing at Newark, in the county of Licking and State of Ohio, have invented certain new and useful Improvements in Vulcanizers; and I do declare the following to be a full, clear, and exact description of the invention, such as will enable others skilled in the art to which it appertains to make and use the same.

This invention relates to improvements in vulcanizers for attaching rubber soles to boots, shoes, etc., and has for its object the provision of a simple and practical device of this character which is adjustable not only to the various sizes of shoes, etc., but also to the peculiar curves and shapes.

With the above and other objects in view, the invention consists of certain novel features of construction, and the combination and arrangement of parts as will be more fully described and claimed.

I attain these objects by the construction illustrated in the accompanying drawing, in which:—

Figure 1 is a side elevation of the vulcanizer.

Fig. 2 is a top plan view thereof.

Fig. 3 is a rear end elevation thereof.

Fig. 4 is a sectional view taken on the line 4—4 of Fig. 2.

Fig. 5 is a sectional view taken on the line 5—5 of Fig. 2.

Similar numerals refer to similar parts throughout the several views.

The vulcanizer includes two heater sections 1, each of which is preferably provided with a longitudinally extending chamber 2 formed in the lower portion and adapted to receive the heating element, said sections being heated by steam or electricity, as preferred. The heater sections are provided with transverse slots 3 which are alined and adapted to receive suitable bolts 4 upon the threaded ends of which wing nuts 5 are received.

A shoe sole receiving recess 6 is formed in each of the heater sections 1 by cutting away the upper inner edges and portions of the upper faces of the sections, the walls 7 of said recess being curved inwardly toward their upper edges, the bottom being slightly concave to conform to the shape of the ordinary shoe sole. The bottom of each recess 6 is cut away as shown at 8 in Fig. 5 to form a seat for a bridge strip 9 which is preferably formed of ductile material to permit shaping according to the size and shape of the shoe. This plate spans the opening between the two sections 1 and prevents escape of the soft rubber between said sections when it is heated.

The transverse slots 3 and bolts 4 permit longitudinal and transverse relative adjustment of the two heater sections 1, thereby varying the size of the sole receiving recess, the bridge strip being sufficiently long to be used for several different sized shoes. The bridge strip 9, being formed of ductile material, may be easily bent to the proper shape and has its forward end bent upwardly above the upper edge of the recess to assist in retaining the sole in its proper position on the shoe while being vulcanized.

A pressure block 10 of a suitable size and shape is adapted to be placed in a shoe upper and then the upper and block are positioned in the recess 6, after a sheet of rubber has been placed in the recess 6.

For the purpose of permitting pressure to be exerted on the pressure block 10, an adjustable yoke 11 is provided, said yoke being substantially inverted V-shape with a pair of parallel arms 12 formed on the ends of the V-shaped portion, said arms each having a transverse threaded aperture 13 near its end for the reception of a threaded bolt 14. The bolts 14 have their inner ends tapered for reception in longitudinal grooves 15 as indicated in dotted lines in Fig. 1, these grooves making it possible to relatively move the two heater sections, varying the size and shape of the sole receiving recess. The yoke carries a clamp screw 16 mounted in a threaded aperture at the apex of the V-shaped portion and extending downwardly through a guide bar 17 which is secured between the diverging arms of the V-portion. The lower end of the clamp screw carries a block 18 rotatably mounted thereon, and secured to said block is a resilient cushion 19 preferably rubber, contacting with the pressure block or the upper of the shoe in which the pressure block is disposed. It is apparent that this cushion will prevent cutting the leather or rubber of which the shoe or boot is formed.

In operation, a sheet of raw rubber is placed in the recess 6 and the pressure block 10 is positioned inside of the boot or shoe upper to which a rubber sole is to be vulcanized, the upper and block are then seated in the recess, and the clamp screw tightened against the block. The heat is turned into the chamber 2 formed for that purpose and the sections 1 become heated, whereupon the raw rubber is vulcanized to the upper.

Should the recess not fit the shape and size of the boot or shoe, the sections 1 may be shifted relatively, and the bridge strip 9 bent around until the shape and size is suitable.

The yoke and pressure block, being removable, may be placed on a steam table and used for purposes other than merely clamping the block on shoes while vulcanizing soles on them.

From the foregoing description, taken in connection with the accompanying drawings, the construction and operation of the invention will be readily understood without requiring a more extended explanation.

Various changes in the form, proportion and minor details of construction may be resorted to without departing from the principle or sacrificing any of the advantages of the claimed invention.

I claim:—

1. A shoe sole vulcanizer including a pair of spaced substantially rectangular heater sections, each section having a chamber for the reception of a heating means, said sections having a sole receiving recess in the upper faces, said recess having a longitudinal channel in its bottom, a bridge strip disposed in said channel and means for permitting relative longitudinal and transverse adjustment of the blocks and securing them in their adjusted positions to vary the size and shape of said recess.

2. A device of the character described comprising a pair of spaced heater sections each having a chamber for the reception of a heating means, said sections having a sole receiving recess, said sections having a pair of transversely alined longitudinally extending grooves in the outer opposite sides of said sections, and means connecting the sections, said means having portions received in said grooves to permit relative longitudinal movement of said sections.

3. The combination with a pair of spaced heater sections having chambers for receiving a heating means a sole receiving recess in the upper face and pair of transveresely alined longitudinally extending grooves in the outer faces of the sections; of a substantially inverted V-shaped yoke adapted to embrace said sections and means carried by said yoke for reception in said grooves whereby the sections may be relatively longitudinally adjusted and held in their adjusted positions to vary the size and shape of the recess.

4. A shoe sole vulcanizer including two heater sections each having a sole-receiving recess, said sections being movable relatively to vary the size of the recess, a pressure block receivable in said recess, an adjustable yoke embracing said sections, and a clamp screw carried by said yoke to engage the block.

5. A shoe sole vulcanizer including two heater sections each having a sole-receiving recess, said sections being movable relatively to vary the size of the recess, a removable bridge strip covering the space between the sections, a pressure block receivable in said recess an adjustable yoke embracing said sections, a pair of adjustable bolts carried by the arms of said yoke and slidably engaging the outer sides of the sections to permit longitudinal relative movement of said sections for varying the size of the recess, and a clamping screw carried by the yoke and movable into and out of engagement with said pressure block.

6. A shoe sole vulcanizer including two heater sections each having a sole-receiving recess, a bridge strip disposed in the bottom of said recess, a pressure block receivable in the recess, said sections each being provided in its outer side with a longitudinal groove, an adjustable yoke embracing said sections and carrying transversely alined threaded bolts adapted to have their inner ends seated in said grooves to permit relative longitudinal movement of the two sections for varying the size of said recess, and a clamping screw carried by said yoke and movable into and out of engagement with the pressure block.

7. A shoe sole vulcanizer including two heater sections provided with a sole-receiving recess, said recess having a longitudinal channel in its bottom, a bridge strip disposed in said channel, a pressure block receivable in said recess, said sections being movable relatively to vary the size of said recess, means for retaining said sections in their adjusted position, and means for exerting pressure on said block.

8. A shoe sole vulcanizer including two heater sections each provided with a sole-receiving recess, said recess having a longitudinal channel in its bottom, a bridge strip of ductile material disposed in said channel, said strip having one end bent upwardly above the recess wall, a pressure block receivable in said recess, said sections being movable relatively to vary the size of said recess, means for retaining said sections in their adjusted positions, a clamp screw for exerting pressure on said block and a cushion secured to said screw to engage said block.

9. A shoe sole vulcanizer including two heater sections each having a sole receiving recess, said recess having a longitudinal channel in its bottom, a bridge strip of ductile material disposed in said channel, a pressure block receivable in said recess, an adjustable yoke embracing said sections, a pair of threaded bolts adjustably mounted in the yoke, said sections each being provided with a longitudinal groove in its outer side adapted to receive the inner end of one of the adjustable bolts to permit relative longitudinal adjustment of the sections for varying the size of said recess, and a screw clamp carried by the yoke movable into and out of engagement with said pressure block.

10. A shoe sole vulcanizer including two heater sections each having a sole-receiving recess, said sections being movable relatively to vary the size of the recess, said recess having a longitudinal channel in its bottom, a bridge strip disposed in said channel, a pressure block receivable in said recess, an adjustable yoke embracing said sections transversely, said sections each having in its outer side a longitudinal groove, adjustable threaded bolts carried by the arms of said yoke for slidable engagement in the grooves, a clamp screw carried by said yoke for exerting pressure on said block and a resilient cushion disposed between the block and clamp screw.

In testimony whereof I have hereunto set my hand.

WILLIAM FISHBAUGH.